United States Patent [19]

Schick et al.

[11] Patent Number: 4,625,763

[45] Date of Patent: Dec. 2, 1986

[54] DISC-AXIAL MULTIPORT VALVE

[75] Inventors: David L. Schick, Mt. Prospect; Gary M. Schumann; Charles A. Dolejs, both of Arlington Heights, all of Ill.

[73] Assignee: UOP Inc., Des Plaines, Ill.

[21] Appl. No.: 753,490

[22] Filed: Jul. 10, 1985

[51] Int. Cl.[4] .............................................. F16K 11/06
[52] U.S. Cl. ........................... 137/625.15; 137/625.11; 137/625.46
[58] Field of Search .................... 137/625.46, 625.47, 137/625.16, 625.15, 625.24, 625.23, 625.21, 625.11, 625.12, 625.28, 625.29, 625.18, 625.19, 625.13, 625.14; 210/278, 264; 208/310 R

[56] References Cited

U.S. PATENT DOCUMENTS

| 2,262,224 | 11/1941 | Daniels | 137/625.46 X |
| 2,979,963 | 4/1961 | Snoy | 137/625.11 |
| 2,985,589 | 5/1961 | Broughton et al. | 210/34 |
| 3,040,777 | 6/1962 | Carson et al. | 137/625.15 |
| 3,186,434 | 6/1965 | Hrdina | 137/625.18 X |
| 3,192,954 | 7/1965 | Gerhold et al. | 137/625.11 |
| 3,422,848 | 1/1969 | Liebman et al. | 137/625.15 |

FOREIGN PATENT DOCUMENTS

| 447348 | 7/1927 | Fed. Rep. of Germany | 137/625.11 |
| 124763 | 3/1959 | U.S.S.R. | 137/625.11 |

Primary Examiner—Martin P. Schwadron
Assistant Examiner—John S. Starsiak, Jr.
Attorney, Agent, or Firm—Thomas K. McBride; John F. Spears, Jr.; Richard J. Cordovano

[57] ABSTRACT

A unitary disc-axial multiport valve capable of accomplishing the simultaneous interconnection of a plurality of conduits in accordance with a previously determined cycle, where any conduit communicates with no more than one other conduit at any one cycle step, or valve index position. The conduits to be interconnected are attached to a hollow stationary body, or stator assembly, which is comprised of two sections, or elements, one being cylindrical in exterior form and the other having a disc-like form with a central opening and being joined to the cylindrical element at one end in a flange-like manner. There are fluid flow paths in a rotating body, or rotor assembly, which is located partially inside the stator assembly, extending through the central opening in the discular element of the stator. The form of the rotor assembly is similar to that of the stator assembly. The rotor assembly assumes various positions according to the cycle steps and distributes fluid flowing into and out of the valve in a different manner in each cycle step. There are spaces between the rotor and stator assemblies which contain sealing means for prevention of leakage and definition of flow passages.

8 Claims, 10 Drawing Figures

DISC-AXIAL MULTIPORT VALVE

FIELD OF THE INVENTION

This invention relates to apparatus for transferring a plurality of fluid streams among different locations. More particularly, it relates to a unitary multiport valve which is capable of accomplishing the simultaneous interconnection of a plurality of conduits in accordance with a predetermined periodic sequence.

INFORMATION DISCLOSURE

U.S. Pat. No. 3,040,777 (Carson et al.) and U.S. Pat. No. 3,422,848 (Liebman et al.) describe multiport rotary disc valves which have been used in practicing the process of U.S. Pat. No. 2,985,589 (Broughton et al.), which is described herein, and other similar processes. A valve having utility similar to the apparatus of Carson and Liebman is disclosed in U.S. Pat. No. 3,192,954 (Gerhold et al.); this valve employs a cylindrical rotor within a surrounding stator, as exemplified by FIG. 8.

BRIEF SUMMARY OF THE INVENTION

This invention is a disc-axial multiport valve useful in transferring a plurality of different fluid streams among different locations in accordance with a previously determined cycle. The fluid streams are contained in conduits which are interconnected by means of the valve. Any conduit communicates with no more than one other conduit at any one cycle step, or valve index position. The conduits to be interconnected are attached to a hollow stationary body, or stator assembly, which is comprised of two sections, or elements, one being cylindrical in form and the other having a disc like form and being joined to the cylindrical element at one end in a flange-like manner.

There are fluid flow channels in a rotating body, or rotor assembly, which is located partially inside the stator assembly. The rotor assembly assumes various positions according to the cycle steps and distributes fluid flowing into and out of the valve in a different manner in each cycle step. There are spaces between the rotor and stator assemblies which contain sealing means for prevention of leakage and definition of flow passages.

It is among the objects of this invention to provide unitary mechanical valve apparatus for simultaneously accomplishing the interconnection of a plurality of conduits in accordance with a previously determined cycle.

It is also among the objectives to provide a valve smaller in physical size and having fewer maintenance requirements than prior art valves.

A broad embodiment of the invention comprises a stator assembly having a hollow interior and an open end, having means for attachment of said plurality of conduits and being comprised of a stator cylindrical element and a stator discular element which has a central opening for insertion of a rotor cylindrical element and is joined to the open end of the stator cylindrical element in a flange-like manner, the stator discular element having a sealing surface which faces outward with respect to the stator cylindrical element and is perpendicular to an axis of rotation, which axis of rotation is the longitudinal axis of both the stator assembly and a rotor assembly, the stator discular element having a plurality of internal passages extending from the sealing surface to an exterior surface of the stator discular element, to which stator discular element exterior surface conduits are connected so that each passage communicates with one of said conduits, where the intersections of the passages with the sealing surface are arranged in a circle centered on the axis of rotation, and where there are a plurality of ports in the stator cylindrical element, each port in communication with one of said conduits; said rotor assembly comprised of said rotor cylindrical element and a rotor discular element which is joined to an end of the rotor cylindrical element, the rotor cylindrical element being located substantially inside the hollow interior of said stator cylindrical element, the rotor discular element having a sealing surface which faces inward with respect to the rotor cylindrical element, which sealing surface is perpendicular to said axis of rotation, and which sealing surface is parallel to said stator discular element sealing surface, the rotor assembly having a plurality of interior channels, each channel extending from said rotor sealing surface to the exterior surface of the rotor cylindrical element, the number of said channels being equal to the number of said stator assembly ports, and which rotor assembly rotates about said axis of rotation to various valve index positions in accordance with said previously determined cycle; means for definition of non-intersecting fluid paths between said rotor channels and said stator ports and means for definition of nonintersecting fluid paths between said stator passages and said rotor channels.

Another embodiment of the invention is a valve comprising a stator assembly having a hollow interior, having said plurality of conduits connected to it, and being comprised of stator cylindrical element and a stator discular element which is joined to an end of the stator cylindrical element, the stator discular element having a transverse surface which faces outward with respect to the stator cylindrical element and is perpendicular to an axis of rotation, which axis of rotation is the longitudinal axis of both the stator assembly and a rotor assembly, the stator discular element having a plurality of internal passages, each passage extending from the transverse surface to an exterior surface of the stator discular element, to which stator discular element exterior surface conduits are connected so that each passage communicates with one of said conduits, where the intersections of the passages with the transverse surface are arranged in a circle centered on the axis of rotation, and where there are a plurality of ports in the stator cylindrical element, each port in communication with one of said conduits; said rotor assembly comprised of a rotor cylindrical element and a rotor discular element which is joined to an end of the rotor cylindrical element, the rotor cylindrical element being located substantially inside the hollow interior of said stator cylindrical element such that an annular volume is formed between the rotor cylindrical element and said stator cylindrical element, the rotor discular element having a transverse surface which faces inward with respect to the rotor cylindrical element, which transverse surface is perpendicular to said axis of rotation, and which transverse surface is parallel to said stator discular element transverse surface, the rotor assembly having a plurality of interior channels, each channel extending from said rotor transverse surface to the exterior surface of the rotor cylindrical element, the number of said channels being equal to the number of said stator assembly ports, where a transverse volume is formed between said rotor transverse surface and said stator transverse surface, and which rotor assembly rotates about said axis of rotation to various valve index positions in accordance with said previously determined cycle; means in said annular volume for definition of fluid paths such that fluid can pass between said rotor channels and said stator ports; means in said transverse volume for definition of fluid paths such that fluid can pass between said stator passages and said rotor channels; and means for restraining the rotor element, whereby movement in a longitudinal direction is prevented.

An embodiment of the valve may be further described in that said conduits are divided into two groups, a first group in communication with said stator ports and a second group in communication with said stator passages, any conduit of the first group communicates only with conduits of the second group, any conduit of the second group communicates only with conduits of the first group, and each fluid flow path through the valve at any index position consists of one of said stator ports, one of said annular volume fluid paths, one of said rotor assembly channels, one of said transverse volume fluid paths, and one of said stator passages.

BACKGROUND OF THE INVENTION

There are many instances in which it is necessary to route a fluid stream to one location for a period of time, then to another location for a period of time, and so forth for multiple locations. This relatively simple problem of routing a single fluid stream to various destinations in a previously determined cycle or periodic sequence is easily acccomplished with one or more devices such as a multiport rotary plug valve. When it is necessary to simultaneously route more than a single fluid stream to various destinations, it is highly desirable to use a single device rather than numerous individual valves, as discussed in the above-mentioned Carson patent (U.S. Pat. No. 3,040,777). A multiport disc-axial valve is such a device.

Figure 1:
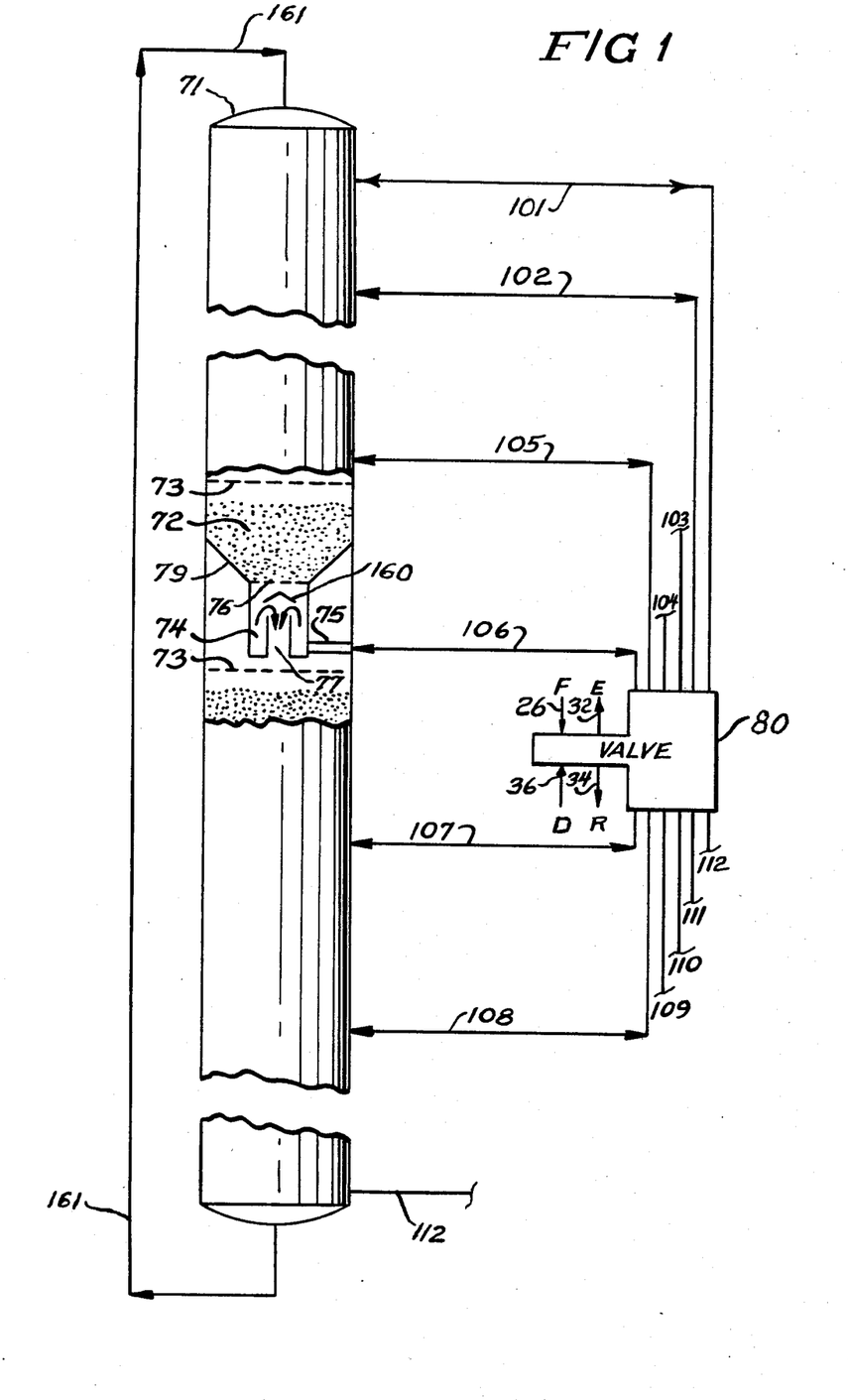
FIG. 1 is a schematic depicting the Broughton process (U.S. Pat. No. 2,985,589); it shows a vessel containing a plurality of beds and conduits connecting the beds with a disc-axial multiport valve and also shows conduits for streams entering and leaving the process connected to the valve.

The separation of various substances through selective absorption using a simulated moving bed of adsorbent is an example of a process in which an axial multiport rotary valve is useful. Simulation of a moving adsorbent bed is described in U.S. Pat. No. 2,985,589 (Broughton et al.), which is mentioned above. FIG. 1 depicts process and apparatus of this patent. In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations or origins of at least three other streams, which may be streams entering the beds, such as the feed stream, or streams leaving the beds. The moving bed simulation may be simply described as dividing the bed into a series of fixed beds and moving the points of introducing and withdrawing liquid streams past the series of fixed beds instead of moving the beds past the introduction and withdrawal points.

The multiport rotary disc valve of Carson (U.S. Pat. No. 3,040,777) provided a satisfactory valve design for the simultaneous interconnection of two independent groups of conduits such that each conduit of the first group could be brought into individual communication with every conduit of the second group. Upon reference to FIG. 1 and Broughton (U.S. Pat. No. 2,985,589), it can be seen that there are two groups of conduits which need to be interconnected. One group consits of the conduits which provide the flows entering and leaving the simulated moving bed adsorbent system, that is, the flows which are switched among the beds, such as the feed stream. A second group consists of the conduits associated with the individual beds, that is, which supply and remove fluid from the beds, one conduit being connected between each two beds. It is to be noted that each conduit of the second group serves that dual function of supply and removal, so that it is unnecessary to provide conduits for supplying fluid separate from those for removing fluid.

There are many different process requirements in moving bed simulation processes, resulting in different flow schemes and thus variations in rotary valve arrangement. For example, in addition to the four basic streams described in Broughton (U.S. Pat. No. 2,985,589), it may be desirable to utilize one or more streams to purge, or flush, a pipeline or pipelines. A flush stream is used to prevent undesirable mixing of components. The flush substance is chosen to be one which is not undesirable for mixing with either main stream, that being purged or that which enters the pipeline after flushing is completed. U.S. Pat. No. 3,201,491 (Stein et al.) may be consulted for information on flushing lines as applied to the process of Broughton (U.S. Pat. No. 2,985,589). It may be desirable to pass fluid through a bed or beds in the reverse direction from normal flow. This is commonly known as backflushing, a subject treated in U.S. Pat. No. 4,319,929 (Fickel).

Multiport rotary disc valves of the general arrangement shown in the above-mentioned patents (U.S. Pat. No. 3,040,777 and U.S. Pat. No. 3,422,848) have been fabricated in various sizes up to valves utilizing 4½ foot diameter rotors. These valves have seven concentric circumferential grooves, or tracks, and 24 ports spaced around the periphery of the stator. A single valve of this size weighs approximately 26,000 pounds, has an overall height of about 15 feet, and occupies a plan area of approximately 8½ by 8½ feet. These figures do not include a separate hydraulic power unit used with the hydraulically driven actuator mounted on the valve proper. It can be appreciated that it is desirable to use apparatus of less bulk and weight to accomplish the same functions; the present invention provides such a smaller rotary valve.

It is highly desirable to use a single device to simultaneously transfer all of the fluid streams, thereby avoiding the obvious problems associated with numerous separate valves which must be simultaneously actuated.

BRIEF DESCRIPTION OF THE DRAWINGS

FIGS. 5 and 6 are taken.

DETAILED DESCRIPTION OF THE INVENTION

Following is a description of the embodiment of the invention shown in FIGS. 1 through 9. It is not intended that such description be construed as limiting the scope of the invention in any way; the description of this example is intended as merely a convenient means to become familiar with the invention. The elements of the invention may be arranged to form other embodiments and more or fewer conduits than shown in these drawings may be accommodated. Various required equipment, such as pumps, has been omitted from FIG. 1 as not essential to an understanding of the invention, the application of such being within the capabilities of those skilled in the art.

FIG. 1 depicts an exemplary processing system which will be used in describing the invention. This process is described fully in previously mentioned U.S. Pat. No. 2,985,589 (Broughton) and it is only necessary to describe herein, in order to understand the present invention, the required fluid flow arrangement and cycle, further details being available from the patent. An explanation of the process is presented above and supplemented in the following paragraphs.

Referring to FIG. 1, there are twelve beds in vessel 71; one bed 72 is shown in the cutaway portion of FIG. 1. The bed 72 is retained by bed support means 76, such as a screen, at the bottom of the conical section 79. Liquid is distributed evenly over the top of the bed by distributor 73, which may be a perforated plate. Liquid which flows through the bed is collected in reservoir 74. If liquid is to be removed from reservoir 74, it will flow out through an internal conduit 75 which communicates between the reservoir and a conduit 106 external to vessel 71. Conduit 106 carries liquid to or from rotary valve 80. If liquid is not to be added or removed, the flow path is blocked inside valve 80 and liquid overflows the reservoir and passes through downcomer 77 to another distributor 73, to be distributed over the next lower bed. If liquid is to be added, it flows in from the valve through conduit 106, overflows into the downcomer, and is distributed over the next lower bed in the same manner as liquid flowing through bed 72. Baffle 160 prevents liquid leaving bed 72 from passing directly through downcomer 77 without being collected in reservoir 74. A conduit such as conduit 106 is associated with each bed and functions in the same manner as conduit 106. The twelve conduits, each of which runs between the vessel and the valve, are denoted 101 through 112.

There are four basic process streams. There may be additional streams, such as the flush stream mentioned above. This example is limited to the four basic process flows, whose connection points to vessel 71 and the beds therein are changed at each cycle step. They are labeled in FIG. 1; F denotes feed (conduit 26), D denotes desorbent (conduit 36), E denotes extract (conduit 32), and R denotes raffinate (conduit 34).

Since there are twelve beds and four process streams, liquid flows to or from any given bed only intermittently. The simulated moving bed may be viewed as being divided into four zones, one zone corresponding to each process stream. For example, if each zone contains three beds, liquid flows in conduit 106 every third step and during the other two steps, all liquid leaving bed 72 flows through downcomer 77 to the bed below. If the beds are numbered from B1 through B12, starting at the top of vessel 71, bed 72 is B6. If, at cycle step 5, feed (F) flows to bed B6, then raffinate (R) will flow from bed B9, desorbent (D) will flow to bed B12, and extract (E) will flow from bed B3. During step 6, F will flow to B7, R from B10, D to B1 and E from B4. The flows will sequence in a similar manner through the balance of the twelve steps of the cycle and then repeat. Return line 161 carries liquid which has passed through bed B12 (or entered through conduit 112) to the top of vessel 71 for distribution over bed B1. Note that it is not necessary that each zone contain an equal number of beds.

Figure 2:
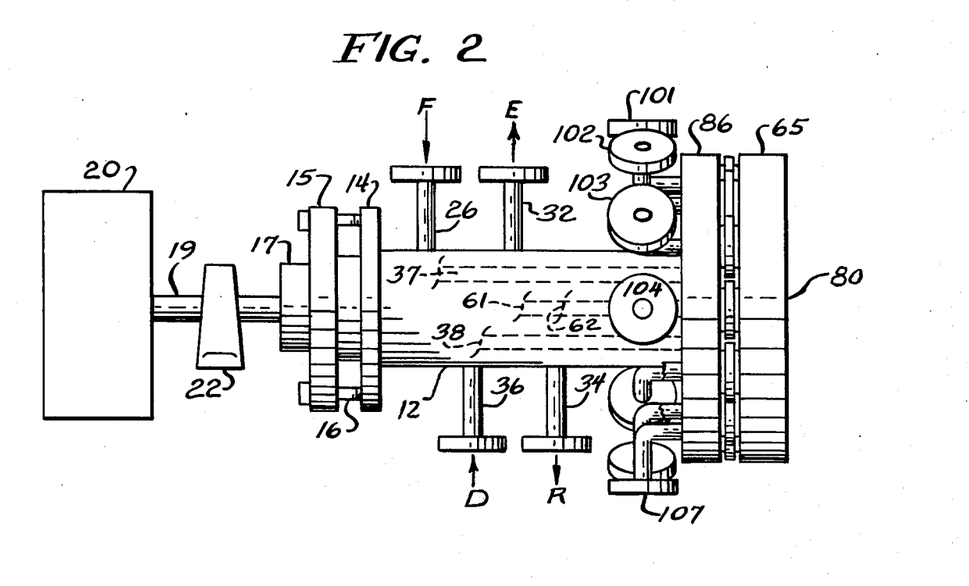
FIG. 2 depicts a disc-axial multiport valve with labels referring to FIG. 1. Certain details are omitted for the sake of drawing convenience.

Referring to FIG. 2, a stator assembly, or stator, is comprised of cylindrical element 12 and discular element 86. A rotor assembly, or rotor, is located partially within the hollow interior of the stator assembly. Rotor cylindrical element 17 projects out of stator cylindrical element 12 and rotor discular element 65 is located adjacent to stator discular element 86. Attached to the rotor is shaft 19 and the rotor is partially supported in bearing assembly 22. The stator cylindrical element has a flange 14, to which seal ring follower 15 is attached to bolts 16. The function of the seal ring follower is discussed below. Either assembly, rotor or stator, may be separable into parts independent of the terminology used herein; the use of the word elements is not intended to convey that the assembly must be separable into the two elements described.

Means for rotating the rotor assembly about an axis of rotation are denoted by reference number 20. The axis of rotation is the extended center line of shaft 19, or the longitudinal axis of both assemblies. In this particular example, the rotor is rotated 30° increments, with any one of twelve rest positions of the rotor being defined as a valve index position and representing the rotor position at, or during, a single cycle step. Such means for indexing a shaft, or rotating it in increments of usually less than a full rotation, are well known and may be characterized broadly as hydraulic, electrical, or electromechanical. An example of means for rotating may be found in U.S. Pat. No. 2,948,166 (Purse et al). Also, a stepping motor may be used.

Referring to FIGS. 1 and 2, the twelve conduits, 101 through 112, are connected to twelve flanged nozzles attached to stator discular element 86 of valve 80. Not all of the nozzles can be seen in FIG. 2. The nozzles of FIG. 2 are labeled to indicate which conduits are connected to them, e.g., conduit 102 is connected to the nozzle labeled 101. There are four flanged nozzles attached to stator cylindrical element 11. The four process streams are routed to and from the stator cylindrical element. Note the correspondence in labelling between FIGS. 1 and 2; for example; feed (F) enters the valve via nozzle 26.

Figure 3:
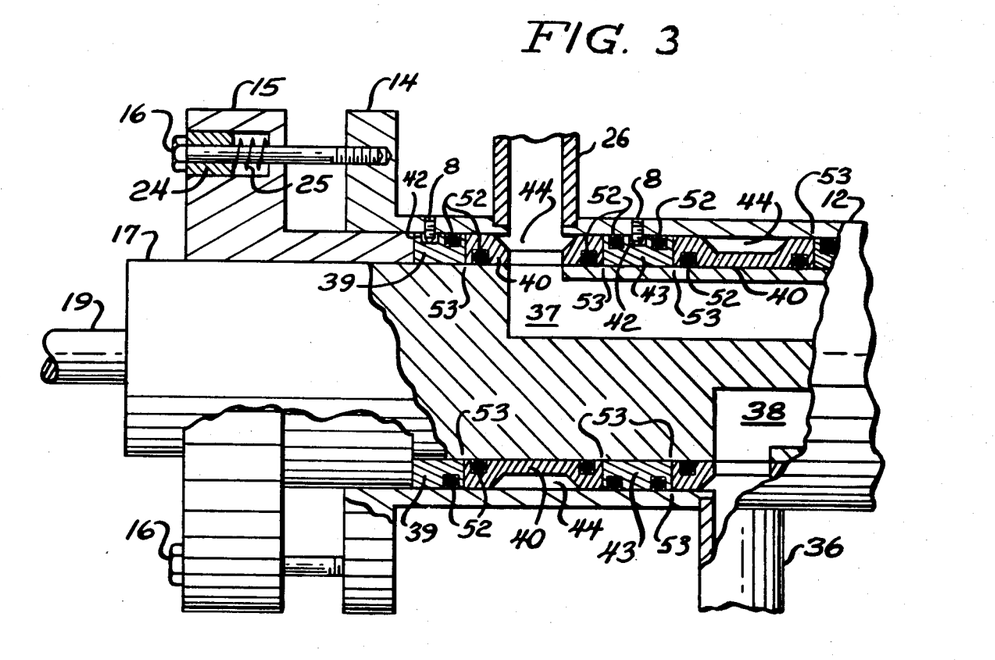
FIG. 3 is a partial section view of the left hand end of the valve of FIG. 2, including a portion of a stator cylindrical element, and a portion of a rotor cylindrical element. The rotor position is that of cycle step 1. Certain details are omitted for the sake of drawing convenience.
Figure 6:
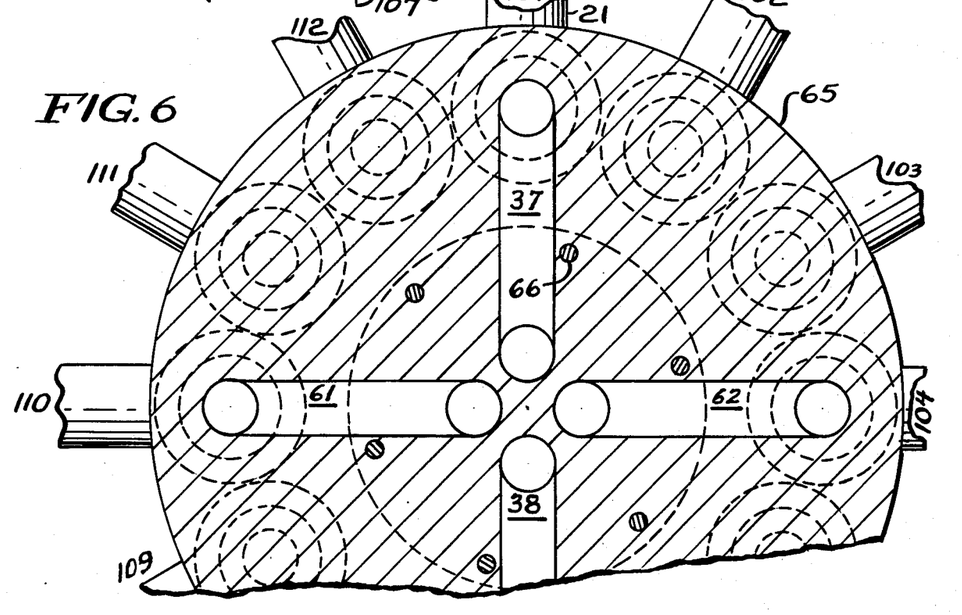
FIG. 6 is a section, taken as shown in FIG. 4, of the rotor assembly discular element of the valve of FIG. 2.

Now referring to FIG. 3, which depicts the left end of the exemplary valve, the applicable reference numbers of FIG. 2 are used. Rotor cylindrical element 17 is located inside stator end element 12. Nozzles 26 and 36 of FIG. 2 are shown in FIG. 3. Two interior channels 37 and 38 are shown in rotor cylindrical element 17. There are two additional channels (not shown) in rotor cylindrical element 17 and all four channels extend into the rotor discular element as shown in FIG. 6. Four channels are depicted by dashed lines in FIG. 2. Channel 37 communicates with nozzle 26 and channel 38 communicates with nozzle 36. At each of its nozzles, 26 and 36, there is a port, or aperture, in the wall of the stator assembly. Stator cylindrical element 12 has a larger inside diameter than the outside diameter of rotor end element 17, thus forming an annular space, or annular volume, between the elements. As shown in FIG. 3, this annular space contains a number of seal rings. In contact with the portion of seal ring follower 15 which projects into the annular volume is an end seal ring 39. Adjacent to end seal ring 39 is a rotating seal ring 40 and next to that is a stationary seal ring 43. Another rotating seal ring 40 is adjacent to stationary seal ring 43 on the other side.

Figure 7:
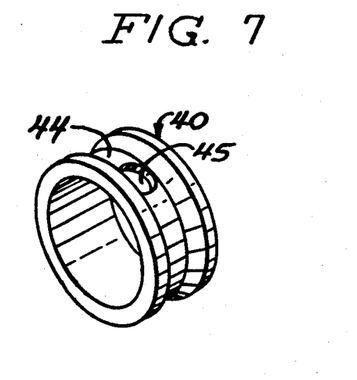
FIG. 7 depicts a rotating seal ring.

All of the nozzles located on the stator cylindrical element communicate with the annular space existent between the rotor cylindrical element and the stator cylindrical element. The seal rings are means by which fluid passages in the annular space are defined, intermixing of fluids in the annular space is prevented, and external leakage is prevented. For example, fluid flowing in channel 37 and nozzle 26 is separated from fluid in channel 38 and nozzle 36 by the seal rings. Rotating seal ring 40 extends circumferentially around the rotor cylindrical element and is configured such that annular passage 44 is formed in a portion of the annular space between the stator and rotor cylindrical elements, between the inside wall of the stator cylindrical element and the outside surface of ring 40. FIG. 7 shows an entire rotating seal ring. Note that O-rings 52 are omitted from the inner surface of the seal ring depicted in FIG. 7. An aperture 45 (FIG. 7) in seal ring 40 is aligned with channel 37 and permits fluid to flow between channel 37 and annular passage 44. Since annular passage 44 is circumferential, extending 360° around the rotor assembly, the passage is always in communication with nozzle 26, thereby nozzle 26 and channel 37 are always in communication. Similarly, each of the other channels of the rotor cylindrical element are always in communication with a particular nozzle attached to the stator cylindrical element (nozzles 32, 34 and 36 of FIG. 2). Note that the aperture 45 in a seal ring 40 is always alinged with a rotor channel but not always aligned with a nozzle as shown in FIG. 3. An O-ring 52 is located on each side of the ring 40, as shown in FIG. 4, to prevent fluid from the aperture 45 and the annular passage 44 from flowing in a longitudinal direction parallel to the axis of rotation along the outside surface of the rotor end element and the inside surface of the ring 40.

End seal ring 39 does not rotate and is held in place by means of a set screw 8 inserted through the wall of the stator cylindrical element and projecting into cavity 42 of ring 39. Rotating seal rings 40 are attached to the rotor and rotate with it. Attachment is accomplished by means of a set screw in each rotating seal ring 40 or by other means familiar to those skilled in the art. Stationary seal ring 43 is prevented from rotating by means of a set screw in the same manner as end seal ring 39. O-rings 52 prevent fluid leakage between the rotor cylindrical element and rotating seal rings 40, as described above, and between the stator cylindrical element and the stationary seal rings 43 or end seal ring 39, in the same manner. Leakage does occur between the wall of the stator and rotating seal ring 40. This leakage lubricates and is contained at seal interface 53 which extends 360° around the rotor end element and is in a plane perpendicular to the axis of rotation. The sealing surfaces at interface 53 may be any of the well-known seal face. For example, a common pair of seal face materials are carbon and tungsten. Seal ring 40 may be fabricated entirely of tungsten and rings 39 and 43 may be fabricated entirely of carbon, or carbon and tungsten may be applied to other base ring materials solely to form the sealing surfaces at interface 53.

Figure 4:
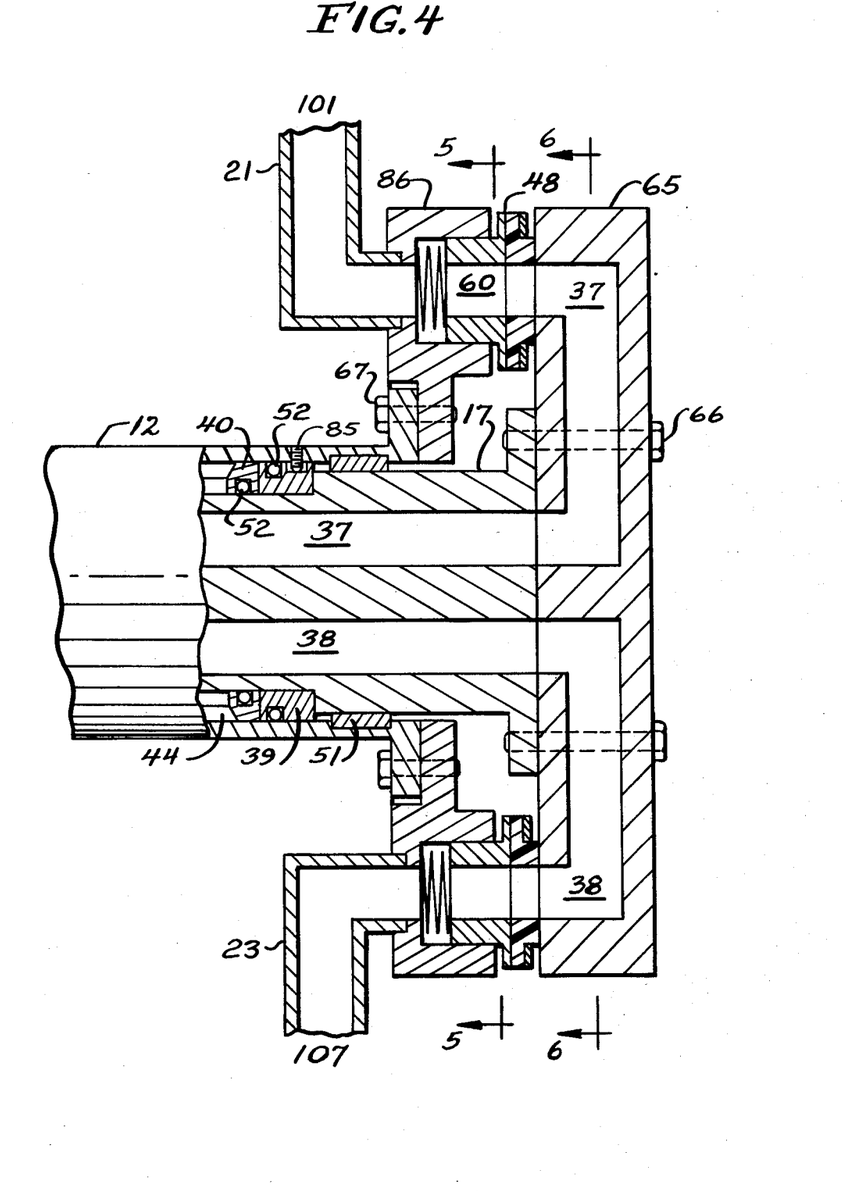
FIG. 4 is a section view of the right hand end of the valve of FIG. 2, which includes portions of rotor and stator cylindrical elements along with rotor and stator discular elements. The rotor position is that of cycle step 1. Certain details are omitted for the sake of drawing convenience. Section arrows show how

FIG. 4 shows stator discular element 86 and a portion of stator cylindrical element 12, along with rotor discular element 65 and a portion of rotor cylindrical element 17. Rotor discular element 65 and rotor cylindrical element 17 are joined together by means of bolts such as 66. In a like manner, the two stator elements are joined together by bolts such as 67. Rotor sleeve 51 provides spacing between stator cylindrical element 12 and rotor cylindrical element 17 and serves as a bearing. There are four channels in the stator, of which two, 37 and 38, can be seen in FIGS. 3 and 4. Each channel communicates with the annular volume at one end and the transverse volume at the other end.

The complete arrangement of the annular space between cylindrical elements may now be understood (FIGS. 3 and 4). A rotating seal ring 40 is located at each of the four nozzles of stator cylindrical element 12. Between the rotating seal rings are located stationary seal rings 43. There are three stationary rings. At each end of the annular space formed by the cylindrical elements is an end seal ring 39. Only one end of the annular space between cylindrical elements can be seen in FIG. 3. The other end is shown in FIG. 4, where it can be seen that the assembly of seal rings in the annular volume is retained by a shoulder on the rotor cylindrical element which is adjacent to rotor sleeve 51. Set screw 85 prevents the end seal ring from rotating. At the outboard end, the assembly of rings is held in place by seal follower 15 (FIG. 3). Also, sealing force is applied to the sealing surface interfaces 53 by means of seal follower 15. A spring 25 is provided at each of several bolts 16. Spacers 24 enable springs 25 to be compressed by turning bolts 16 and, therefore, urge seal follower 15 toward the stator discular element, thereby providing sealing force.

The transverse volume is the space between the transverse surface of rotor discular element 65 and the transverse surface of stator discular element 86. The transverse surface of the stator discular surface is that which faces outward with respect to the stator cylindrical element. The transverse surface of the rotor discular element is that which faces inward with respect to the rotor cylindrical element.

There are 12 passages in stator discular element 86. Each passage extends from the stator transverse surface to another surface of the stator, to which is attached a nozzle. Each passage has an enlarged diameter portion in order to accommodate a transverse seal element. Referring to FIG. 4, transverse seal element 48 is shown in a passage which communicates with nozzle 21.

Figure 8:
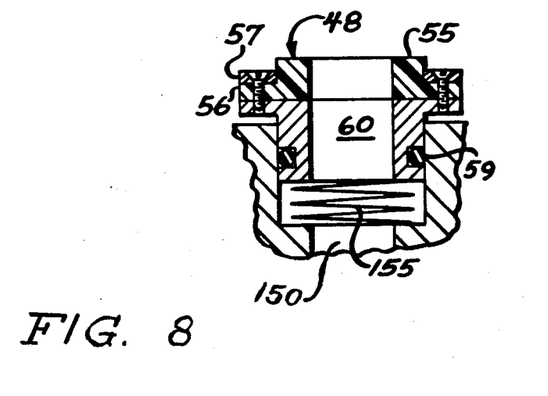
FIG. 8 is a section view of a transverse seal element such as those of FIG. 4.
Figure 9:
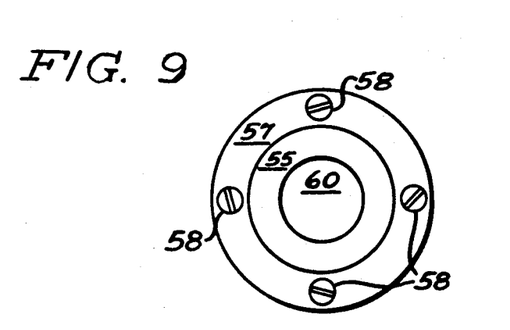
FIG. 9 is a top view of the transverse seal element of FIG. 8.

Definition of fluid passages and prevention of intermixing, in the transverse volume, of these streams and others is accomplished by means of transverse seal elements 48. The flow path through transverse seal element 48 is denoted by reference number 60. FIG. 8 shows a section view of a single transverse seal element 48. FIG. 9 shows a top view, including the sealing surface, of a transverse seal element 48. A transverse seal element is located at one end of each passage in the stator discular element. In this embodiment, there are twelve transverse seal elements 48. Referring to FIG. 8, a length of cylindrical conduit which comprises an elongated cylindrical portion of a transverse seal element 48 is located within a portion of passage 150. That portion of passage 150 has a larger diameter than the other portion of the passage such that a shoulder is formed to retain spring 155 (FIG. 8). Each transverse seal element is provided with O-ring 59 (FIG. 8) around its outer circumference to prevent leakage along the wall of the passage. A flat plate portion is attached to the cylindrical portion and is covered by rotor seal element seat 56. Spring 155 presses sealing face 55 against the transverse surface of rotor discular element 65, which is smooth and polished to prevent leakage. Sealing face 55 is a portion of transverse seal element seat 56, which is formed of a soft elastomeric material. Transverse seal element seat 56 is held in place by means of retainer 57 and four screws 58. Rotation of the rotor assembly results in wear at surface 55, as a result of the movement of the surface around the transverse surface of the stator discular element. Spring 155 provides sealing force and will maintain it as wear occurs, but periodically rotor element seat 56 will need to be replaced. The movement of transverse seal element 48 in the enlarged portion of the passage is relatively small and such movement does not affect the sealing ability of O-ring 59.

Figure 5:
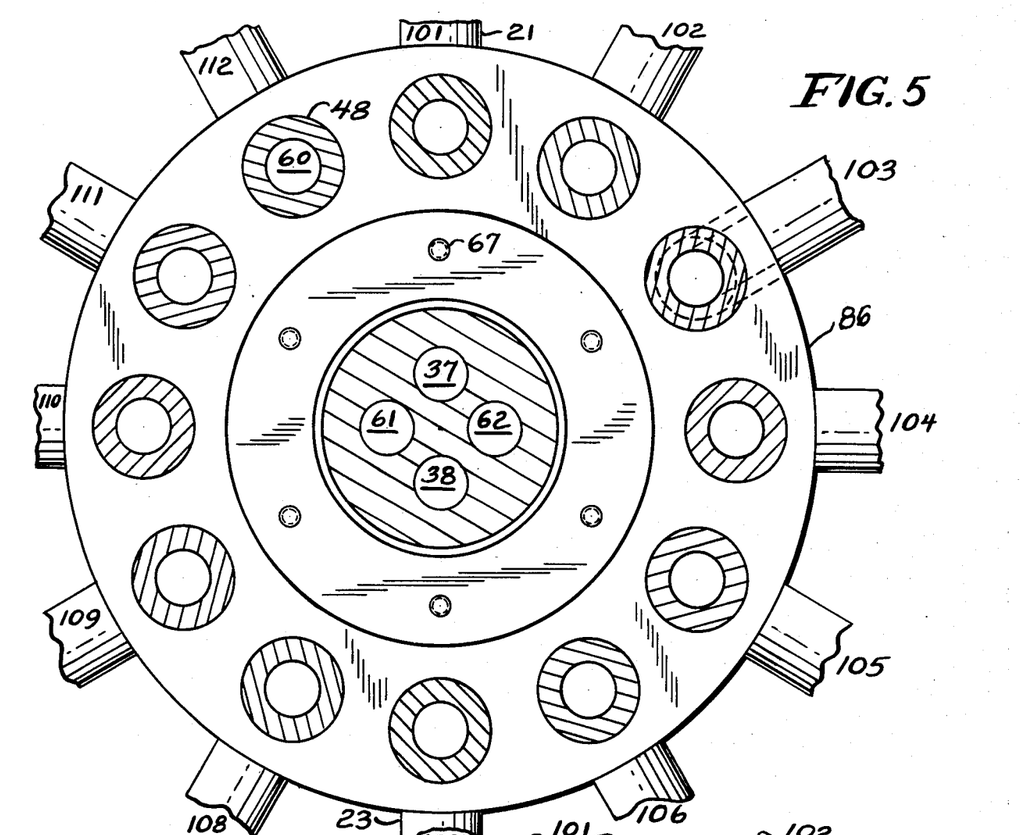
FIG. 5 is a view of the stator discular element, taken as shown in FIG. 4.

FIG. 5 is an end view of the stator assembly, taken as shown in FIG. 4, so that a portion of each transverse seal element is shown. All twelve passages in the stator discular element are shown. One of the portions of a transverse seal element is labeled with the reference numbers used in FIG. 4, transverse seal element 48 and seal element flow path 60. All four rotor channels, 37, 38, 61 and 62 can be seen in this view. The twelve nozzles which are attached to the stator discular element to provide fluid paths between the stator passages and the conduits are labeled with the reference numbers of the conduits.

FIG. 6 is a section taken through the rotor discular element as shown in FIG. 4. The refernce numbers shown in FIGS. 5 and 6 allow the previously described items to be identified in these views.

The complete fluid flow paths through the valve at each cycle step may now be described. At cycle step 1, feed (F) entering the valve flows through nozzle 26 (FIGS. 1, 2 and 3). It flows from the nozzle to channel 37, passing through a stator assembly port and the annular space between rotor and stator cylindrical elements, which space contains a seal ring 40 having a flow path consisting of annular passage 44 and aperture 45 (FIG. 3). F then passes through rotor channel 37 into nozzle 21 (FIGS. 4, 5, and 6) via a transverse rotor seal element 48 having fluid passage 60 (FIG. 4), which seal element provides a fluid path for the feed through the transverse volume between rotor discular element 65 and stator discular element 86 (FIG. 4). Thus, in cycle step 1, which has been arbitrarily chosen, F passes through conduit 101 and is distributed over bed B2.

Also, in step 1 of the cycle, extract (E) enters the valve from conduit 110 (FIGS. 1, 5 and 6), flows through a stator passage and a transverse seal element into channel 61 (FIGS. 2, 5 and 6), and then flows through channel 61 to nozzle 32 via a rotating seal ring annual passage and aperture and a stator port.

In cycle step 2, F passes through nozzle 26 in the same manner as in cycle step 1. However, since the valve has indexed 30°, channel 37 is not now aligned with the port in the stator cylindrical element as it was in cycle step 1, so the feed must flow through a 30° arcuate portion of annular passage 44 before entering aperture 45 and then channel 37. The other end of channel 37 is now aligned with the stator passage which communicates with conduit 102, so that feed enters column 71 and passes onto bed number 3. It can be seen that the direction of rotation of the rotor assembly is clockwise.

In the detailed example presented herein, where the fluids flowing in the process are liquids, pumps are required at certain locations. No further mention of apparatus such as pumps and compressors used to transfer fluid need be made, as those familiar with chemical processing are able to appreciate when such apparatus is required and where in the process it needs to be located.

It is necessary to provide means for prevention of movement of the rotor in an axial direction. An inspection of the drawings shows that forces may act to move the rotor toward the right. There are numerous methods of retaining the rotor, such as providing a thrust bearing at a location such as bearing housing 22 of FIG. 2 or providing members attached to a valve base plate which bear against the outside flat surface of the rotor discular element.

Means for sealing in the annular volume other than the seal rings described above may be used. The annular space between end elements may be filled with conventional shaft packing and compressed by means similar to seal ring follower 15. Stationary lantern rings may be used in place of the rotating seal rings to provide fluid flow passageways analogous to annular passage 44. Another alternate to the above-mentioned seal rings is lip-type seals. These might be used alone or in conjunction with rings spaced along the shaft to aid in defining fluid passages, such rings being identical in configuration to a stack of flat washers. The rotor cylindrical element could be comprised of an elastomer cylinder having appropriate fluid paths mounted on a steel shaft, thereby eliminating the need for separate sealing elements.

There are alternates to the use of transverse seal elements 48. For example, the transverse volume could be occupied by an elastomeric liner in the form of a circular sheet with a center portion removed. The elastomer could be fastened to either transverse surface. There are many fastening methods which can be used. An example is the use of recessed members similar to those denoted by reference number 57 in FIG. 8. For a further example, U.S. Pat. No. 3,422,848 (Liebman et al.) may be consulted. If a liner is used, it may be considered to be a part of either the stator or rotor. If a liner is used, it is necessary to provide seating force to urge the rotor transverse surface toward the stator transverse surface. This may be accomplished by a spring surrounding the valve shaft, by spring means attached at multiple points around the periphery of the stator discular element and acting on the rotor discular element on in numerous other ways familiar to those skilled in the art. A liner could be of tetrafluoroethylene, either reinforced or non-reinforced, having apertures in appropriate locations to allow fluid to flow.

Figure 10:
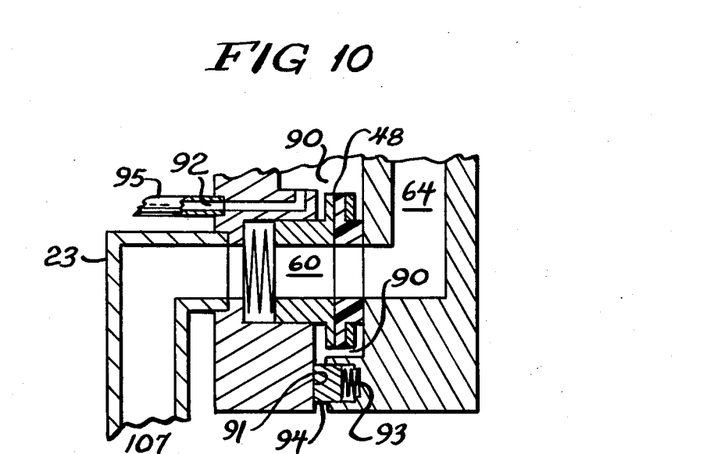
FIG. 10 depicts means for sealing around the periphery of the discular elements of a disc-axial valve.

In the embodiment utilized as an example, it can be seen that when the valve indexes, there may be a considerable leakage of fluid. In order to prevent such leakage, a peripheral seal such as shown in FIG. 10 may be used. Seal element 94, having a diameter slightly less than that of the discular elements is retained in a groove in the rotor discular element and urged against the stator transverse face by springs such as 93. Thus fluid will be retained within the transverse volume. Those skilled in the art will recognize that many alternate methods are available. In order to prevent cross-contamination among the conduits which are interconnected, a flushing fluid may be passed through the transverse volume. Referring again to FIG. 10, flushing fluid may be provided to transverse volume 90 via conduit 95. Reference FIG. 92 shows the fluid flow path. The flushing fluid would be removed by means of a similar arrangement at an appropriate location.

Valves having different numbers of nozzles than shown in the example, to accommodate more or fewer conduits, can be designed. When a rotary valve is referred to an indexing, it is meant that the rotor assembly is moving. A valve index position refers to one of the positions of a rotor assembly which is stationary and where openings are in register. The components of the present invention may be fabricated from suitable materials of construction, such as metals or plastics. Sizing of the flow passages is easily accomplished by reference to any of the numerous standard methods which are available.

To illustrate valve dimensions, a rotor assembly for a valve suitable for use in the Broughton process discussed above with twelve beds and moderate fluid flow rates requiring 1½-inch diameter channels may have a length of 30 inches, not including shaft and drive means, with a stator diameter of 8 inches at the cylindrical element and 18 inches at the discular element. A rotor end element having four 4-inch diameter channels to handle fluids at moderate pressures may have a diameter of 14 inches.

In the detailed example, references have been made to nozzles, such as nozzle 26, which can be seen in FIGS. 1, 2 and 3. It should be noted that a nozzle may be simply considered to be a part of a conduit to which it is attached. Thus, conduits may be attached directly to the valve at both ports and passages, so that a conduit communicates directly with a port or passage without passing through a nozzle.

We claim as our invention:

1. A disc-axial multiport valve for accomplishing the simultaneous interconnection of a plurality of conduits in accordance with a previously determined cycle, where any conduit communicates, by means of the valve, with no more than one other conduit at any one valve index position, comprising:
   (a) a stator assembly having a hollow interior and an open end, having means for attachment of said plurality of conduits and being comprised of a stator cylindrical element having a hollow interior and an open end and a stator discular element which has a central opening for insertion of a rotor cylindrical element and is joined to the open end of the stator cylindrical element in a flangelike manner, the stator discular element having a transverse surface which faces outward with respect to the stator cylindrical element and is perpendicular to an axis of rotation, which axis of rotation is the longitudinal axis of both the stator assembly and a rotor assembly, the stator discular element having a plurality of internal passages extending from the transverse surface to an exterior surface of the stator discular element, to which stator discular element exterior surface conduits are connected so that each passage communicates with one of said conduits, where the intersections of the passages with the transverse surface are arranged in a circle centered on the axis of rotation, and where there are a plurality of ports in the stator cylindrical element, each port in communication with one of said conduits;
   (b) said rotor assembly comprised of said rotor cylindrical element and a rotor discular element which is joined to an end of the rotor cylindrical element, the rotor cylindrical element being located substantially inside the hollow interior of said stator cylindrical element, the rotor discular element having a sealing surface which faces inward with respect to the rotor cylindrical element, which sealing surface is perpendicular to said axis of rotation, and which sealing surface is parallel to said stator discular element transverse surface, the rotor assembly having a plurality of interior channels, each channel extending from said rotor sealing surface to the exterior surface of the rotor cylindrical element, the number of said channels being equal to the number of said stator assembly ports, and which rotor assembly rotates about said axis of rotation to various valve index positions in accordance with said previously determined cycle;
   (c) means for definition of non-intersecting fluid paths between said rotor channels and said stator ports; and,
   (d) means for definition of non-intersecting fluid paths between said stator passages and said rotor channels.

2. A disc-axial multiport valve for accomplishing the simultaneous interconnection of a plurality of conduits in accordance with a previously determined cycle, where any conduit communicates, by means of the valve, with no more than one other conduit at any one valve index position, comprising:
   (a) a stator assembly having a hollow interior, having said plurality of conduits connected to it, and being comprised of a stator cylindrical element having a hollow interior and a stator discular element which is joined to an end of the stator cylindrical element, the stator discular element having a transverse surface which faces outward with respect to the stator cylindrical element and is perpendicular to an axis of rotation, which axis of rotation is the longitudinal axis of both the stator assembly and a rotor assembly, the stator discular element having a plurality of internal passages, each passage extending from the transverse surface to an exterior surface of the stator discular element, to which stator discular element exterior surface conduits are connected so that each passage communicates with one of said conduits, where the intersections of the passages with the transverse surface are arranged in a circle centered on the axis of rotation, and where there are a plurality of ports in the stator cylindrical element, each port in communication with one of said conduits;

(b) said rotor assembly comprised of a rotor cylindrical element and a rotor discular element which is joined to an end of the rotor cylindrical element, the rotor cylindrical element being located substantially inside the hollow interior of said stator cylindrical element such that an annular volume is formed between the rotor cylindrical element and said stator cylindrical element, the rotor discular element having a transverse surface which faces inward with respect to the rotor cylindrical element, which transverse surface is perpendicular to said axis of rotation, and which transverse surface is parallel to said stator discular element transverse surface, the rotor assembly having a plurality of interior channels, each channel extending from said rotor transverse surface to the exterior surface of the rotor cylindrical element, the number of said channels being equal to the number of said stator assembly ports, where a transverse volume is formed between said rotor transverse surface and said stator transverse surface, and which rotor assembly rotates about said axis of rotation to various valve index positions in accordance with said previously determined cycle;

(c) means in said annular volume for definition of fluid paths between said rotor channels and said stator ports;

(d) means in said transverse volume for definition of fluid paths between said stator passages and said rotor channels; and (e) means for restraining the rotor element, whereby movement in a longitudinal direction is prevented.

3. The valve of claim 2 further characterized in that said conduits are divided into two groups, a first group in communication with said stator ports and a second group in communication with said stator passages, any conduit of the first group communicates only with conduits of the second group, any conduit of the second group communicates only with conduits of the first group, and each fluid flow path through the valve at any index position consists of one of said stator ports, one of said annular volume fluid paths, one of said rotor assembly channels, one of said transverse volume fluid paths, and one of said stator passages.

4. The valve of claim 2 further characterized in that said means in said annular volume for definition of fluid paths comprises a rotating seal ring attached to and extending circumferentially around the rotor cylindrical element, said ring having a height approximately equal to the width of said annular volume between rotor and stator cylindrical elements and having a length sufficient to contain an aperture and an annular passageway, which aperture and annular passageway provide a fluid flow path between a channel and a stator port, said annular passageway extending 360° around said ring and bounded on one side by a portion of inside surface of the stator cylindrical element and on the other sides by the ring, said ring having means for sealing to prevent fluid from said stator port and rotor channel from flowing in a longitudinal direction parallel to said axis of rotation along the interface of a portion of surface of the rotor cylindrical element and the inside surface of said ring, and said ring having two lubricated rotating seal surfaces extending 360° around the ring in planes perpendicular to said axis of rotation, where lubrication for said surfaces is provided by fluid leakage from said annular passageway along the interface of outside surfaces of the ring and portions of the interior surface of the stator cylindrical element.

5. The valve of claim 2 further characterized in that said means in said annular volume for definition of fluid paths comprises a stationary seal ring attached to a stator cylindrical element and extending circumferentially around a rotor cylindrical element, said ring having a height approximately equal to the width of said annular volume between stator and rotor cylindrical elements, said ring having means for sealing to prevent fluid from flowing in a longitudinal direction parallel to said axis of rotation along the interface of the outside surface of the ring and a portion of inside surface of the stator cylindrical element, and said ring having at least one lubricated stationary seal surface extending 360° around the ring in a plane perpendicular to said axis of rotation, where lubrication for said seal surface is provided by fluid leakage from annular volume fluid path.

6. The valve of claim 2 further characterized in that said means in said transverse volume for definition of fluid paths comprises a transverse seal element comprised of a length of cylindrical conduit at least partially located in and concentric with an enlarged diameter end portion of a passage, which passage is circular in cross-section, said transverse seal element having means for sealing to prevent fluid flow in a direction parallel to the longitudinal axis of said conduit length along the interface of the surface of said enlarged passage portion and the external surface of the conduit length, having a flat plate sealably attached to said conduit at one end, said plate being perpendicular to the longitudinal axis of said conduit and having an aperture located at the end of the conduit so that fluid may flow through the conduit, and having spring means to urge said flat plate into sealing contact with the transverse surface of the rotor discular element.

7. The valve of claim 6 further characterized in that said flat plate portion of said transverse seal element is at least partially covered with an elastomeric material, which is in sealing contact with said transverse surface of said rotor discular element.

8. The valve of claim 2 further including means for sealing disposed around the periphery of said transverse volume between said transverse surfaces.

* * * * *